Dec. 11, 1934.   H. G. MUELLER   1,983,803
STEAM ENGINE VALVE
Filed Feb. 6, 1932   2 Sheets-Sheet 1

Herman G. Mueller
INVENTOR
BY
ATTORNEY

Dec. 11, 1934. H. G. MUELLER 1,983,803
STEAM ENGINE VALVE
Filed Feb. 6, 1932 2 Sheets-Sheet 2

Herman G. Mueller.
INVENTOR

BY
ATTORNEY

Patented Dec. 11, 1934

1,983,803

UNITED STATES PATENT OFFICE 1,983,803

STEAM ENGINE VALVE

Herman G. Mueller, Erie, Pa., assignor to Skinner Engine Company, Erie, Pa., a corporation of Pennsylvania Application February 6, 1932, Serial No. 591,367

5 Claims. (Cl. 121—185)

Steam engine valves subjected as they are to varying temperatures and pressures present a very serious problem in maintaining steam-tightness. This is particularly true of the double beat type of valves. Where the double beat valves are solid, great difficulty is experienced in maintaining an equal spacing of the seats so as to maintain steam-tightness on both seats and where a yielding seat has been used they have not been provided with unbalanced areas compelling steam-tightness. The present invention is designed to improve a double-beat valve, one seat of which is yielding so that they may have steam-tightness and yet may be operated without undue strain on the actuating mechanism. In carrying out my invention I subject each seat of the double beat valve to an unbalanced condition which is at least twice the seating area. In this way it is possible to overcome the separating pressure of steam entering between the seating surfaces and at the same time give such preponderance as to compel and hold the valve seats securely closed. I have discovered that the seating surfaces cannot be safely relied upon as providing an unbalanced area. In fact in some extreme instances there is practically no unbalanced area incident to the part of the valve included in the seating surface. This obtains when the closing engagement is along the outlet edge. Safety in closing, therefore, can only be provided by excluding this area in providing for closing through a preponderance of closing steam pressure and providing a sufficient preponderance, exclusive of the seating surface to provide steam tightness under all conditions of engagement of the seating surfaces. Steam tightness can only be assured also by a preponderance of closing steam area at least equal to the seating surfaces. With the present invention also this is accomplished as to both seats with a minimum of load in opening the valve. In the present invention also the valve stem is so controlled with relation to the valve parts as to add its area to the unbalanced pressure of the valve.

The invention in general is an improvement on the valve disclosed in reissue patent to L. G. Skinner, #13,768 and the patent to Glenn, #1,354,966.

Features and details of the invention will appear from the specification and claims.

A preferred embodiment of the invention is illustrated in the accompanying drawings as follows:—

1 marks the cylinder, 2 the piston in the cylinder, 3 the cylinder head, 4 the inlet steam port, 5 a steam chamber in the head receiving its steam from any convenient source.

Figure 1:
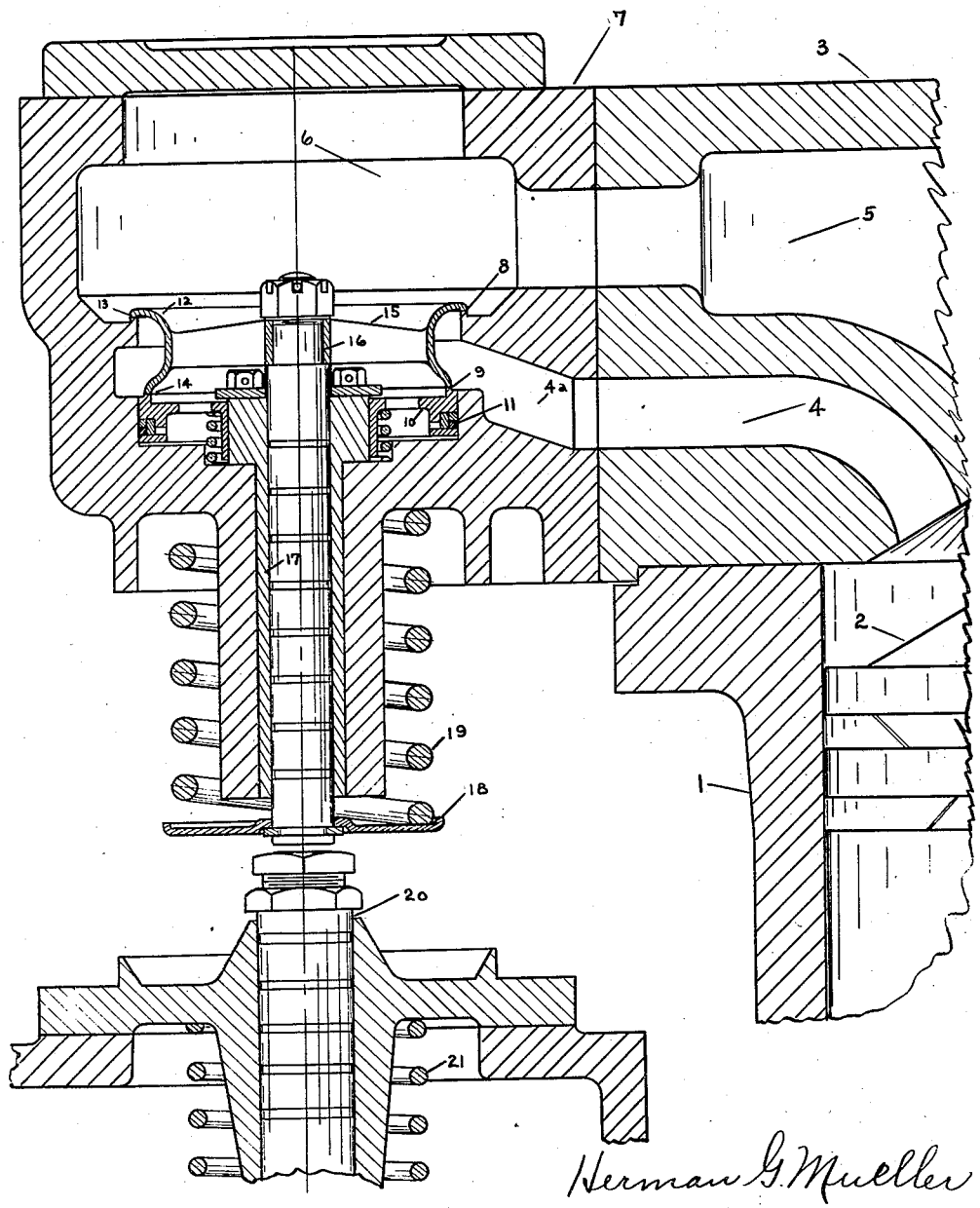
Fig. 1 is a sectional view of a portion of a cylinder with the valve case, or body attached, the parts being in section on the axis of the valve and in a plane including the axis of the cylinder.

The steam is received by a steam chamber 6 which communicates with the chamber 5. The chamber 6 is arranged in the valve case, or body 7. The valve case, or body has a primary valve seat 8 and a secondary valve seat 9. The valve seat 9 has a yielding supporting ring 10, and being provided with a sealing ring 11. These seats are on opposite sides of a port 4a leading to the port 4. A valve head 12 has a primary valve head seat 13 and a secondary valve head seat 14, these seating on the body seats 8 and 9. The primary seat opens from its outer periphery and the secondary seat from within, or its inner periphery. The valve head has a spider 15 and a valve stem 16 is secured to the center of the spider. It extends through a stem sleeve 17 on the body. A cap 18 is arranged on the outer end of the stem and a closing spring 19 operates on the cap. A tappet pin 20 operates on the valve stem and a tappet is provided with the usual spring 21 and with the mechanism for actuating the valve (not shown). As the tappet pin 20 is forced upwardly, as shown in Fig. 1, the valve is opened and when the pin is released, the valve is closed by the spring accommodated by the unbalanced condition of the seats.

Figure 2:
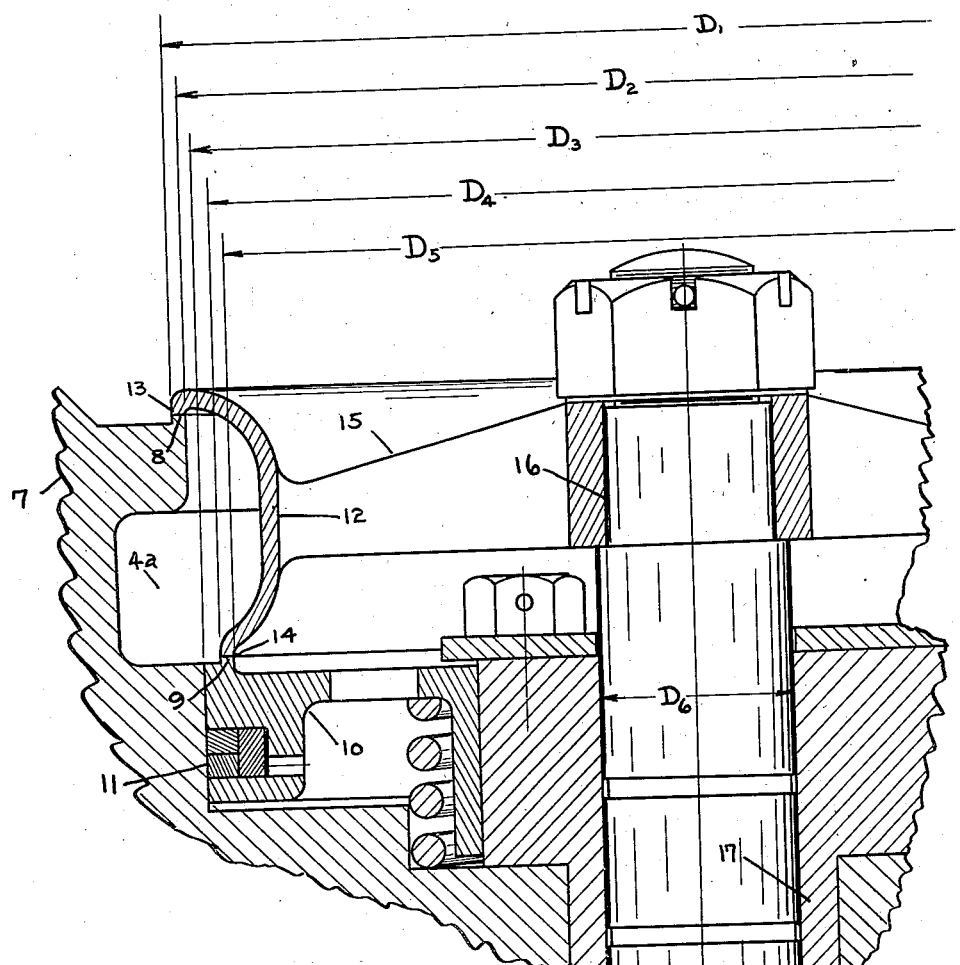
Fig. 2 is a similar enlarged section of the valve body and valve.

As shown in Fig. 2, the steam areas operating on the valve are indicated. The outer diameters of the primary valve head seat 13 and the body seat 8 are indicated by the line $D'$. The inner diameters of these seats are indicated by the line $D^2$ and the area, of course, is represented by the difference in the area of the circles corresponding to these diameters. The periphery of the lower seat supporting ring 10 is indicated by the line $D^3$. The outer and inner diameters of the valve head seat 14 and the surface of the seat 9 engaged thereby are represented by $D^4$ and $D^5$ and represent an area of the difference between circles with these diameters. It will be noted that the difference of the area of a circle on the diameter $D^5$ and a circle on the diameter $D'$ represents the prepoderance of steam area on the upper seat and to this should be added the diameter $D^6$ of the valve stem. The yielding ring 10, however, has an upward, or neutralizing pressure which diminishes this unbalanced condition, which upward pressure is incident to the area between the diameters $D^3$ and $D^5$ so that the effective unbalanced condition on the upper seat is the area between the circle represented by the diameters $D^3$ and $D'$, plus the area of the pin having the diameter $D^6$. This difference, namely, the steam pressure on the area between the diameters $D'$ and $D^3$ is the closing pressure and this again is more or less neutralized by steam that may enter between the seating surfaces. The unbalanced portion of the valve head, however, is at least twice that of the seating surfaces and, therefore, assures steam-tightness.

At the same time the upward seating pressure of the yielding ring 10 on the valve head seat 14 is at least twice the area of the engaged seat surfaces of the secondary seat. It is represented by the area between the diameters $D^3$ and $D^5$ and, of course, this unbalanced condition again is somewhat neutralized by the steam in between the seating surfaces. With this arrangement steam-tightness is assured as to both seats. The lifting pressure on the valve, which is represented by the unbalanced condition incident to the areas between the diameters $D'$ and $D^3$ less the separating pressure between the seats is made as little as consistent with steam-tightness and in this unbalanced condition, of course, the area of the stem should be considered.

What I claim as new is:—

1. The combination of a double beat valve head having two annular valve head seats spaced apart axially; and a valve body having valve body seats receiving the valve head seats, one of said seats being yieldingly mounted and subject to closing steam pressure, the unbalanced areas of the valves in a seating direction assuming the seating surfaces to be included in the unbalanced areas being at least twice as great as the seating surfaces of said valve seats.

2. The combination of a double beat valve head having two annular valve head seats spaced apart axially; and a valve body having valve body seats receiving the valve head seats, one of the body seats being yieldingly mounted and subject to closing steam pressure, the unbalanced areas of the valves in a seating direction assuming the seating surfaces to be included in the unbalanced areas being at least twice as great as the seating surfaces.

3. The combination of a double beat valve head having two annular valve head seats spaced apart axially; a valve body having valve body seats receiving the valve head seats, one of said seats being yieldingly mounted and subject to closing steam pressure; and a valve stem in unbalanced relation as to steam exposed areas, the unbalanced relation being in a closing direction of the valve, the unbalanced areas of the valves and the stem assuming the seating surfaces to be included in the unbalanced areas being at least twice as great as the seating surfaces of the valve.

4. The combination of a double beat valve head having two annular valve head seats spaced apart axially; and a valve body having valve body seats receiving the valve head seats, one of said seats being yieldingly mounted and subject to closing steam pressure, the unbalanced area effective on each valve in a seating direction, assuming the seating surfaces to be included in the unbalanced areas being at least twice as great as the seating surface of each valve respectively.

5. The combination of a double beat valve head having two annular valve head seats spaced apart axially; and a valve body having valve body seats receiving the valve head seats, one of the body seats being yieldingly mounted and subject to closing steam pressure, the unbalanced area effective on each valve in a seating direction assuming the seating surfaces to be included in the unbalanced areas being at least twice as great as the seating surface of each valve respectively.

HERMAN G. MUELLER.